US006739402B1

(12) United States Patent
Olson et al.

(10) Patent No.: US 6,739,402 B1
(45) Date of Patent: May 25, 2004

(54) TRANSPORT DRAWBAR

(75) Inventors: Brian Olson, Regina (CA); Lloyd Wach, Regina (CA); Mel Svenson, Calgary (CA)

(73) Assignees: Power Pin Inc., Regina (CA); Standens Limited, Calgary (CA)

( * ) Notice: Subject to any disclaimer, the term of this patent is extended or adjusted under 35 U.S.C. 154(b) by 0 days.

(21) Appl. No.: 10/359,736

(22) Filed: Feb. 7, 2003

(51) Int. Cl.$^7$ .................. B60D 1/145; A01B 59/04; B21D 53/88
(52) U.S. Cl. .................. 172/272; 172/677; 280/186; 29/897.2
(58) Field of Search .................. 280/186; 172/272–275, 172/810, 439–451, 677–681, 684.5; 29/244, 891, 897, 897.2, 897.3, 897.31, 897.312, 897.35

(56) References Cited

U.S. PATENT DOCUMENTS 5,346,018 A * 9/1994 Koster .................. 172/47

* cited by examiner

Primary Examiner—Christopher J. Novosad

(74) Attorney, Agent, or Firm—Aikins, MacAulay & Thorvaldson LLP; Murray E. Thrift

(57) ABSTRACT

A transport drawbar for an agricultural tractor has an elongate forward drawbar section of substantially uniform rectangular cross section that mounts on the tractor in the conventional way. An elongate second drawbar section extends to the rear from the forward section. The second drawbar section has the same vertical thickness as the forward drawbar section and a substantially greater width. A trailing drawbar section extends to the rear from the second drawbar section, the trailing drawbar section having the same vertical thickness as the forward and second sections and a width substantially the same as the width of the forward section. Two tapering transition sections are provided between the second drawbar section and the forward and trailing drawbar sections respectively. Two angular offsets are formed in the second drawbar section such that the trailing drawbar section is parallel to and offset downwardly from the second drawbar section. This drawbar can be used as a conventional tractor drawbar for pulling implements in the field. It also has sufficient strength and stiffness that it can be used for transporting bulk cargo. The drawbar is manufactured by flame cutting a blank for the drawbar and die forming the angular offsets in the blank. The formed blank is heat treated. Pivot pin holes are formed in the forward section of the blank and a draw pin hole in the trailing section. The blank is then quenched and shot peened.

5 Claims, 3 Drawing Sheets

US 6,739,402 B1

TRANSPORT DRAWBAR

FIELD OF THE INVENTION

The present invention relates to drawbars for agricultural tractors.

BACKGROUND OF THE INVENTION

Farm tractors are being used more frequently for transporting large bulk carriers. Newer tractors have top speeds of from 80 to 100 kph making their use for transportation quite practical. It is therefore often found more cost effective to use a tractor to transport grain, fertilizer, liquid manure, feed etc. rather than purchasing a truck. In some parts of the world this is now a common practice. In North America it is becoming more so.

A tractor generally has a single drawbar that is designed to pull agricultural implements. These implements generally do not exert large vertical loads on the drawbar. When used for towing bulk carriers, however the usual tractor drawbar may be vertically overloaded and may fail. In addition, loose drawbar couplings in such environments are hard on the hitch parts and result in rapid wear.

One attempt to resolve this problem added a bolt-on reinforcement strap to the drawbar. That was positioned, in use, below the drawbar support plate on which the drawbar rests. This has not proven satisfactory. The bottom reinforcement creates concerns over adequate ground clearance and it does not deal with the high shear stresses where the drawbar is cantilevered off the support plate. In addition, failures commonly occur at those places where angular offsets are formed in the drawbar, usually to provide the requisite spacing from a hammer strap mounted on top of the drawbar.

The present invention proposes a novel drawbar that is intended to address these problems.

SUMMARY OF THE INVENTION

According to the present invention there is provided a tractor drawbar comprising an elongate forward drawbar section of substantially uniform rectangular cross section;

an elongate second drawbar section extending rearwardly from the forward drawbar section, the second drawbar section having substantially the same vertical thickness as the forward drawbar section and a width substantially greater than the width of the forward drawbar section;

an elongate trailing drawbar section extending rearwardly from the forward drawbar section, the second drawbar section having substantially the same vertical thickness as the forward drawbar section and a width substantially the same as the width of the forward drawbar section;

two transition sections between the second drawbar section and the forward and trailing drawbar sections respectively; and two angular offsets in the second drawbar section such that the trailing drawbar section is parallel to and offset downwardly from the second drawbar section.

This structure can be used as a conventional tractor drawbar for pulling implements in the field. It has however, sufficient strength and stiffness that it can also be used for transporting bulk cargo. The positions of highest stress are all located in the wide second section, so that the additional transport loads can be handled. The drawbar, being one piece, can easily be installed by sliding it into place in the same way as a conventional drawbar.

According to another aspect of the present invention there is provided a method of manufacturing the drawbar, which comprises:

flame cutting a blank for the drawbar;

die forming the angular offsets in the blank;

heat treating the formed blank;

forming pivot pin holes in the forward section of the blank and a draw pin hole in the trailing section.

It has been found that the flame cutting process may cause the properties of the resultant product to be outside of the required specifications. This problem may be resolved by machining the drawbar from bar stock.

Thus, according to a further aspect of the present invention there is provided a method of manufacturing the drawbar, which comprises:

machining a blank for the drawbar;

die forming the angular offsets in the blank;

heat treating the formed blank;

forming pivot pin holes in the forward section of the blank and a draw pin hole in the trailing section.

Preferably, the blank is quenched after die forming.

BRIEF DESCRIPTION OF THE DRAWINGS

In the accompanying drawings, which illustrate an exemplary embodiment of the present invention.

DETAILED DESCRIPTION

Referring to the accompanying drawings, there is illustrated a tractor drawbar assembly 10. The assembly includes a drawbar 12 and a draw pin assembly 14 mounted on the trailing end of the drawbar. A draw pin assembly of this type is disclosed in U.S. Pat. No. 5,921,699, issued Jul. 13, 1999.

Figure 1:
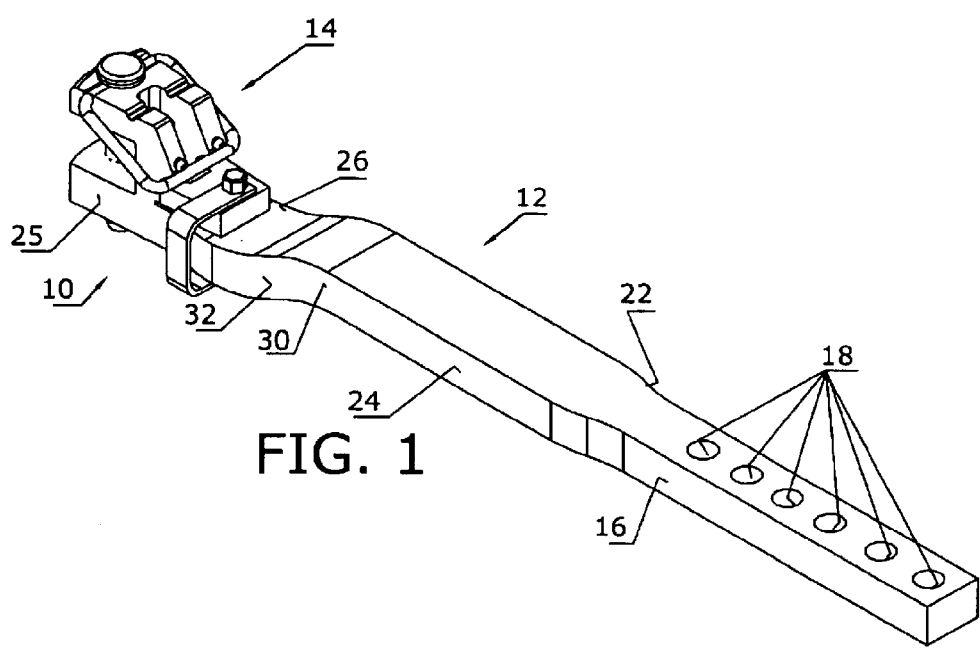
FIG. 1 is an isometric view of a drawbar assembly according to the present invention.
Figure 2:
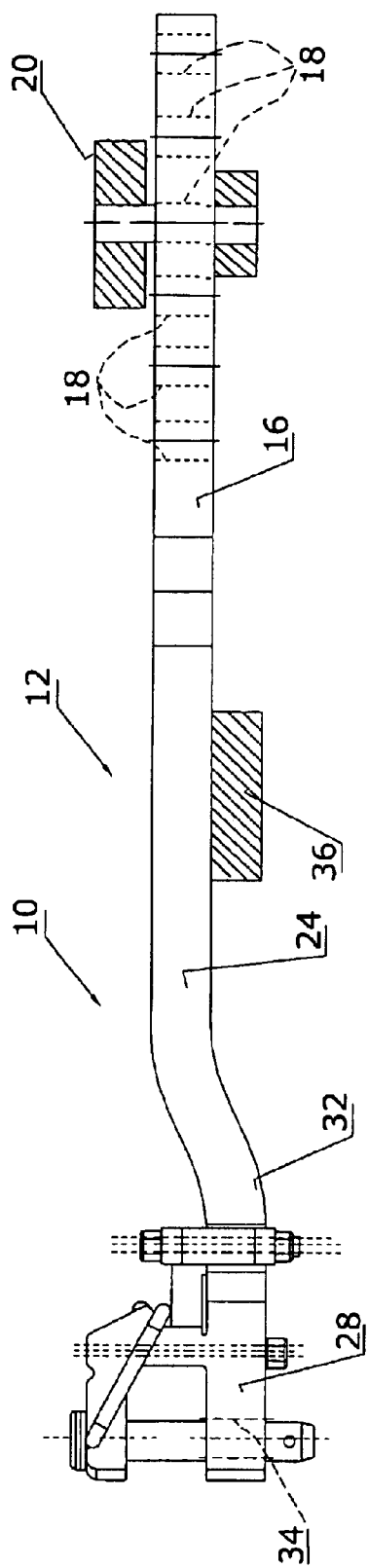
FIG. 2 is a side elevation of the drawbar assembly.
Figure 3:
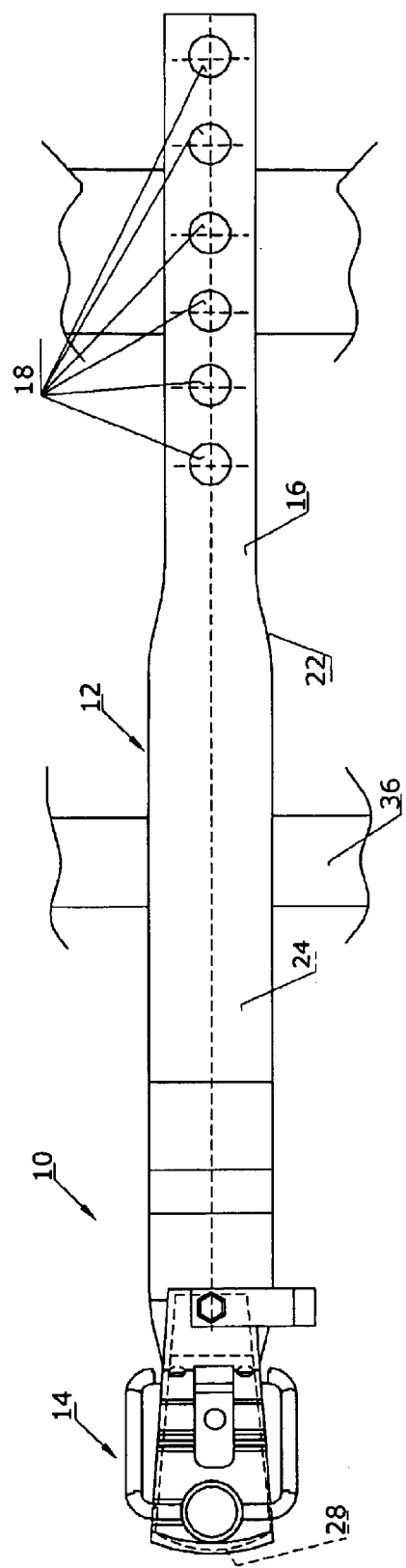
FIG. 3 is a plan view of the drawbar assembly.

The drawbar 12 is an elongate bar with a forward drawbar section 16 that is of rectangular cross section and is configured generally in the same way as the forward section of a conventional drawbar. The forward section 16 has a series of mounting bores 18 that are used to mount the bar on a tractor-mounted pivot pin 20 (FIG. 2). The different bores allow the hitch position to be adjusted longitudinally of the tractor.

At the rear end of the forward section is a flared transition section 22 leading to a centre section 24 which is of the same thickness as the forward section, but is substantially greater in width. A second, tapered transition section 26 extends from the center section to a rearwardly extending elongate trailing hitch section 28. The transition and trailing drawbar sections have substantially the same vertical thickness as the forward drawbar section. The trailing section has a width substantially the same as the width of the forward drawbar section.

Immediately forward of the transition section 26, the center section 24 has two angular offsets 30 and 32 that offset the trailing hitch section downwardly, while keeping it parallel to the center and forward sections.

A draw pin hole 34 is formed in the trailing hitch section 28 adjacent the rear end. When installed, the center section 24 is supported by a drawbar support plate 36, which is a conventional part of the tractor.

With this drawbar configuration, the areas of high stress on the drawbar from high vertical loads at the hitch are exerted in the wide center section, which has a sufficient moment of inertia to accommodate the high bending moments applied.

The currently preferred process for manufacturing the drawbar involves first machining a blank for the drawbar from stock material of the appropriate thickness. The angular offsets are then die formed in the blank, and the blank is quenched. After die forming and quenching, the blank is heat treated to relieve internal stresses. The pivot pin holes are drilled in the forward section of the blank, and hitch mounting holes and a draw pin hole are drilled in the trailing section. The surfaces of the drawbar blank are machined as necessary and both sides are shot peened.

While one embodiment of the present invention has been described in the foregoing it is to be understood that the intention is not to be considered limited to that specific embodiment but may include many others, as will be appreciated by those knowledgeable in the art. For example, it is possible to reduce production costs by flame cutting the blank rather than machining it. The resultant product has, however been found to be less consistent with the desired specifications. The invention is therefore to be considered limited solely by the scope of the appended claims.

Embodiments of the invention in which an exclusive property or privilege is claimed are defined as follows:

1. A tractor drawbar comprising:

an elongate forward drawbar section of substantially uniform rectangular cross section;

an elongate second drawbar section extending rearwardly from the forward drawbar section, the second drawbar section having substantially the same vertical thickness as the forward drawbar section and a width substantially greater than the width of the forward drawbar section;

an elongate trailing drawbar section extending rearwardly from the forward drawbar section, the second drawbar section having substantially the same vertical thickness as the forward drawbar section and a width substantially the same as the width of the forward drawbar section;

two transition sections between the second drawbar section and the forward and trailing drawbar sections respectively; and two angular offsets in the second drawbar section such that the trailing drawbar section is parallel to and offset downwardly from the second drawbar section.

2. A method of manufacturing a drawbar according to claim 1, which method comprises:

flame cutting a blank for the drawbar;

die forming the angular offsets in the blank;

heat treating the formed blank;

forming pivot pin holes in the forward section of the blank and a draw pin hole in the trailing section.

3. A method of manufacturing a drawbar according to claim 1, which method comprises: machining a blank for the drawbar;

die forming the angular offsets in the blank;

heat treating the formed blank;

forming pivot pin holes in the forward section of the blank and a draw pin hole in the trailing section.

4. A method according to claim 3 including the step of quenching the blank after die forming.

5. A method according to claim 3 including the step of shot peening the blank.

* * * * *